No. 737,892. PATENTED SEPT. 1, 1903.
E. M. ANDERSON & G. E. POST.
BINDER.
APPLICATION FILED JAN. 30, 1903.
NO MODEL.
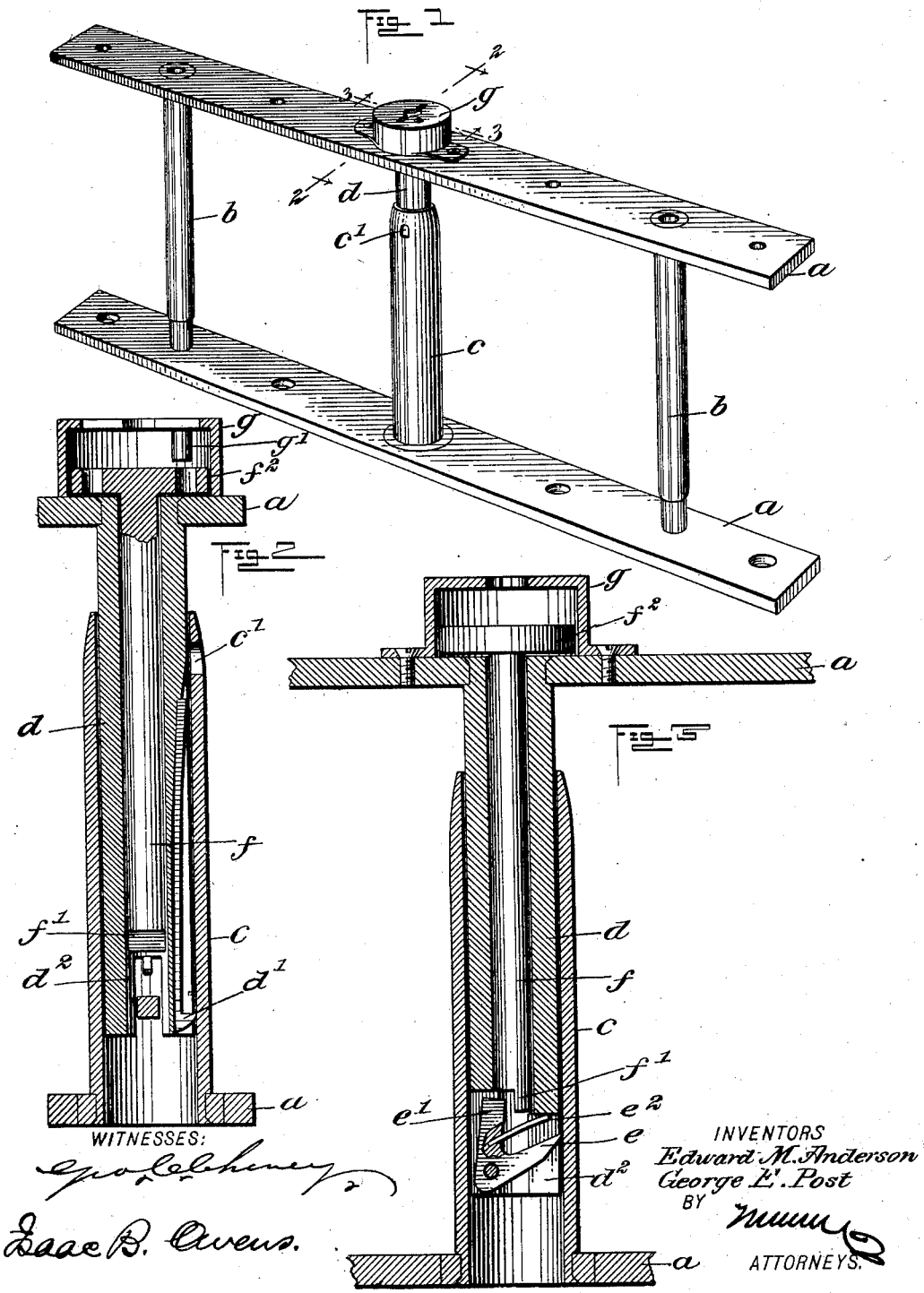
WITNESSES:
INVENTORS
Edward M. Anderson
George E. Post
BY
ATTORNEYS.

No. 737,892. Patented September 1, 1903.

UNITED STATES PATENT OFFICE.

EDWARD MARRIUS ANDERSON AND GEORGE EZEKIEL POST, OF NEW YORK, N. Y.; SAID POST ASSIGNOR TO ANDERSON & PRIGGE, OF NEW YORK, N. Y.

BINDER.

SPECIFICATION forming part of Letters Patent No. 737,892, dated September 1, 1903.

Application filed January 30, 1903. Serial No. 141,132. (No model.)

*To all whom it may concern:*

Be it known that we, EDWARD MARRIUS ANDERSON and GEORGE EZEKIEL POST, citizens of the United States, and both residents of the city of New York, borough of Manhattan, in the county and State of New York, have invented a new and Improved Binder, of which the following is a full, clear, and exact description.

This invention relates to what is known as "loose-leaf" or "perpetual" ledgers; and it resides particularly in the locking mechanism by which the clamping-sections of the binder may be held locked at any distance apart, so as to accommodate any desired number of leaves.

The locking device comprises the usual telescoping parts, the inner of which carries a dog which permits a free telescoping or inward movement, but impinges against the inner wall of the outer tube, so as to prevent outward movement. This dog is controlled by a cam-like member which is mounted to turn in the inner lock-section and when thrown to a certain position engages the dog and moves it into active position.

This specification is an exact description of one example of our invention, while the claims define the actual scope thereof.

Reference is to be had to the accompanying drawings, forming a part of this specification, in which similar characters of reference indicate corresponding parts in all the views.

Figure 1 is a perspective view of the binder-frame, the covers and leaves being omitted from the view. Fig. 2 is a section on the line 2 2 of Fig. 1, and Fig. 3 is a section on the line 3 3 of Fig. 1.

$a$ indicates the two clamping-sections. $b$ indicates the usual telescoping posts extending between them and serving to carry the leaves, as will be understood from the prior art.

Fastened rigidly to one of the sections $a$, and, according to the construction here shown, at the middle thereof, is the outer telescoping tube $c$, which may or may not be roughened on its inner surface and which is provided at its inner end with an opening $c'$, the purpose of which will be hereinafter explained.

$d$ indicates the inner telescoping section, which is tubular and is fastened securely to the other clamping-section in position to slide in the section $c$. A spring-catch $d'$ is carried in a cavity formed in the outer surface of the inner telescoping section $d$, and this catch is arranged to engage the opening $c'$ in the tube $c$ to limit the outward movement of the clamping-sections—that is to say, to prevent the sections from being drawn outward sufficiently to disconnect the telescoping parts. The dog is essentially in the form of an elbow-lever and is mounted in a cavity $d^2$, formed in the end of the section $d$. The limb $e$ of the dog is the active limb, which works against the inner surface of the tubular section $c$ and allows free telescoping movement, but normally prevents outward movement. The limb $e'$ of the dog projects upward in the cavity $d^2$ and carries a suitable spring $e^2$, which bears against the upper wall of the cavity and holds the dog normally in active position.

$f$ indicates a rod which extends longitudinally through the inner telescoping or tubular section $d$ and is arranged to turn therein, the inner end of this rod carrying a cam or eccentric-like portion $f'$, lying opposite the limb $e'$ of the dog. When this rod $f$ lies in the position shown in the drawings, it has no effect upon the action of the dog, which then acts, as before explained, to prevent outward movement of the parts. When, however, the rod is given a partial turn, its cam $f'$ strikes the dog and moves the active limb $e$ upward, so that the dog lies wholly within the walls of the cavity $d^2$, and the section $d$ is therefore capable of moving freely and unrestrainedly in the section $c$. The outer end of the rod $f$ has a head $f^2$ thereon, this head lying against the outer face of the clamping-section, to which the part $d$ is fastened. The said head is provided with cavities in its outer face for the reception of a key, as illustrated.

$g$ indicates a key plate or case which sets over the head $f^2$ and is slotted to permit the introduction of the key. This key-plate also carries a pin $g'$, which limits the movement of the key. This pin $g'$ prevents turning the key in the wrong direction and also prevents excessive movement.

The manner of using the invention will be fully understood from the prior art. It is sufficient for us to say that owing to the manner in which the dog is arranged it is impossible for the dog to fail in action and owing to the extreme simplicity of the parts the construction thereof may be made so secure as to render their destruction practically impossible.

If desired, the device for preventing the total disconnection of the sections may be placed in the end posts $b$; but it is preferable to place it in the position illustrated, since in this manner all of the working parts of the device are concentrated.

It will be observed that should the rod $f$ be turned accidentally, so as to place the openings in the head $f^2$ out of alinement with the slot in the key-plate, then by drawing the sections $a$ apart the action of the dog on the cam end $f$ of the rod will automatically return the rod to the position shown in Fig. 2.

Various other changes in the form, proportions, and minor details of our invention may be resorted to at will without departing from the spirit and scope thereof. Hence we consider ourselves entitled to all such variations as may lie within the intent of our claims.

Having thus described our invention, we claim as new and desire to secure by Letters Patent—

1. The combination of the two telescopic tubular sections, the inner section having a cavity in its inner extremity, a dog in the form of an elbow-lever mounted in said cavity, one limb of the dog extending transversely to engage the outer section and the other limb of the dog extending approximately longitudinally of the sections, a spring pressing the dog into active position, and means carried on the inner section for operating the dog, said means comprising a rod extending through the inner section and turning therein and a cam on the rod.

2. In a binder, the combination with the clamping-sections, of two telescopic tubes, a dog mounted on the inner tube and coacting with the outer tube, for the purpose specified, and an operating member for the dog, said operating member passing loosely through the inner tube.

3. In a binder, the combination with the clamping-sections, of two telescopic tubes, a dog mounted on the inner tube and coacting with the outer tube for the purpose specified, and an operating member for the dog, said operating member passing loosely through the inner tube and being arranged to turn therein, the inner end of the operating member having a cam-like form and coacting with the dog.

4. In a binder, the combination with the two clamping-sections, of telescopic tubes, a dog carried by the inner tube and acting against the outer tube, for the purpose specified, said dog having two limbs one of which engages the outer tube, and an operating member arranged to turn in the inner tube and having a cam-like portion coacting with the other limb of the dog.

5. In a binder, the combination with the clamping-sections, of two telescopic members, a double-limbed dog pivoted on one member and having one limb coacting with the other member, for the purpose specified, and an operating device for the dog, said operating device being mounted to turn and having a cam-like end engaging the second limb of the dog.

In testimony whereof we have signed our names to this specification in the presence of two subscribing witnesses.

EDWARD MARRIUS ANDERSON.
GEORGE EZEKIEL POST.

Witnesses:
BERNARD I. REILLY,
EDWARD HUMBERT.